United States Patent
Tanaka et al.

(10) Patent No.: US 10,137,407 B2
(45) Date of Patent: Nov. 27, 2018

(54) COMPLEX AMINE ABSORBENT, AND DEVICE AND METHOD FOR REMOVING ONE OR BOTH OF $CO_2$ AND $H_2S$

(71) Applicants: MITSUBISHI HEAVY INDUSTRIES, LTD., Tokyo (JP); THE KANSAI ELECTRIC POWER CO., INC., Osaka-shi, Osaka (JP)

(72) Inventors: Hiroshi Tanaka, Tokyo (JP); Hiromitsu Nagayasu, Tokyo (JP); Takuya Hirata, Tokyo (JP); Tsuyoshi Oishi, Tokyo (JP); Takashi Kamijo, Tokyo (JP)

(73) Assignees: MITSUBISHI HEAVY INDUSTRIES ENGINEERING, LTD., Yokohama-shi (JP); THE KANSAI ELECTRIC POWER CO., INC., Osaka-shi (JP)

( * ) Notice: Subject to any disclaimer, the term of this patent is extended or adjusted under 35 U.S.C. 154(b) by 0 days.

(21) Appl. No.: 14/399,107

(22) PCT Filed: Apr. 25, 2013

(86) PCT No.: PCT/JP2013/062259
§ 371 (c)(1),
(2) Date: Nov. 5, 2014

(87) PCT Pub. No.: WO2013/168588
PCT Pub. Date: Nov. 14, 2013

(65) Prior Publication Data
US 2015/0132207 A1 May 14, 2015

(30) Foreign Application Priority Data
May 11, 2012 (JP) ................................. 2012-109948

(51) Int. Cl.
*B01D 53/14* (2006.01)
*B01D 53/52* (2006.01)
(Continued)

(52) U.S. Cl.
CPC ....... *B01D 53/526* (2013.01); *B01D 53/1425* (2013.01); *B01D 53/1462* (2013.01);
(Continued)

(58) Field of Classification Search
None
See application file for complete search history.

(56) References Cited

U.S. PATENT DOCUMENTS 4,100,099 A * 7/1978 Asperger ........... B01D 53/1493
252/189
4,112,051 A 9/1978 Sartori et al.
(Continued)

FOREIGN PATENT DOCUMENTS

CA 1091429 * 12/1980 ............. B01D 53/16
CA 2657993 A1 12/2007
(Continued)

OTHER PUBLICATIONS

Translation of Written Opinion of the International Searching Authority dated Jul. 16, 2013, issued in corresponding application No. PCT/JP2013/062259; PCT/ISA/237 (4 pages).
(Continued)

*Primary Examiner* — Daniel Berns
(74) *Attorney, Agent, or Firm* — Westerman, Hattori, Daniels & Adrian, LLP

(57) ABSTRACT

An absorbent is prepared by dissolving in water 1) monoethanolamine (MEA) and 2) a primary amine represented by the following formula (1) and having high steric hindrance. Releasability of $CO_2$ or $H_2S$ during regeneration
(Continued)

of the absorbent is thereby improved, and the amount of water vapor used during regeneration of the absorbent in a facility for recovering $CO_2$ or $H_2S$ can be reduced.

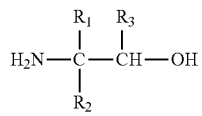

(1)

$R_1$ to $R_3$: H or a hydrocarbon group having 1 to 3 carbon atoms, at least one of $R_1$ to $R_3$ being a hydrocarbon.

5 Claims, 7 Drawing Sheets

(51) Int. Cl.
*B01D 53/62* (2006.01)
*B01D 53/78* (2006.01)
*B01D 53/96* (2006.01)
*B01J 20/22* (2006.01)

(52) U.S. Cl.
CPC ......... *B01D 53/1493* (2013.01); *B01D 53/78* (2013.01); *B01J 20/22* (2013.01); *B01D 2252/2041* (2013.01); *B01D 2252/20405* (2013.01); *B01D 2252/20421* (2013.01); *B01D 2252/20426* (2013.01); *B01D 2252/20447* (2013.01); *B01D 2252/20484* (2013.01); *B01D 2252/504* (2013.01); *B01D 2257/304* (2013.01); *B01D 2257/504* (2013.01); *B01D 2258/0283* (2013.01); *Y02C 10/04* (2013.01); *Y02C 10/06* (2013.01)

(56) References Cited

U.S. PATENT DOCUMENTS

| | | | |
|---|---|---|---|
| 4,112,052 A | 9/1978 | Sartori et al. | |
| 4,336,233 A | 6/1982 | Appl et al. | |
| 6,165,433 A * | 12/2000 | Chakravarti | B01D 53/1475 423/228 |
| 7,918,926 B2 | 4/2011 | Iijima et al. | |
| 8,409,339 B2 | 4/2013 | Iijima et al. | |
| 8,529,678 B2 | 9/2013 | Iijima et al. | |
| 8,535,427 B2 | 9/2013 | Iijima et al. | |
| 8,597,418 B2 | 12/2013 | Inoue et al. | |
| 9,266,102 B2 * | 2/2016 | Remias | B01D 53/1475 |
| 2005/0227976 A1 * | 10/2005 | Setti | C07D 405/06 514/231.2 |
| 2008/0127831 A1 * | 6/2008 | Rochelle | B01D 3/143 96/181 |
| 2009/0068078 A1 * | 3/2009 | Grobys | B01D 53/1456 423/220 |
| 2009/0158930 A1 * | 6/2009 | Wagner | B01D 53/1406 95/179 |
| 2009/0277330 A1 | 11/2009 | Yoshiyama et al. | |
| 2010/0105551 A1 | 4/2010 | Kim et al. | |
| 2010/0180764 A1 * | 7/2010 | Inoue | B01D 53/1462 95/186 |
| 2010/0282081 A1 | 11/2010 | Yoshiyama et al. | |
| 2011/0135549 A1 * | 6/2011 | Lichtfers | B01D 53/1475 423/228 |

FOREIGN PATENT DOCUMENTS

| | | |
|---|---|---|
| JP | 52-63171 A | 5/1977 |
| JP | 53-100180 A | 9/1978 |
| JP | 61-71819 A | 4/1986 |
| JP | 61-19286 B2 | 5/1986 |
| JP | 1-231921 A | 9/1989 |
| JP | 4-349921 A | 12/1992 |
| JP | 6-285333 A | 10/1994 |
| JP | 6-343858 A | 12/1994 |
| JP | 7-51537 A | 2/1995 |
| JP | 2002-519171 A | 7/2002 |
| JP | 2007-325996 A | 12/2007 |
| JP | 2008-13400 A | 1/2008 |
| JP | 2008-307519 A | 12/2008 |
| JP | 4690659 B2 | 6/2011 |
| WO | 2010/136425 A1 | 12/2010 |
| WO | 2011/082807 A | 7/2011 |
| WO | 2011/121635 A1 | 10/2011 |

OTHER PUBLICATIONS

Extended European Search Report dated Jan. 19, 2016, issued in counterpart European Patent Application No. 13788078.7. (7 pages).
Office Action dated Jul. 16, 2015, issued in counterpart Australian Application No. 2013258901, (3 pages).
International Search Report dated Jul. 16, 2013 issued in corresponding application No. PCT/JP2013/062259.
Office Action dated Mar. 9, 2016, issued in counterpart Canadian Application No. 2,872,593 (4 pages).
Japanese Office Action dated Sep. 8, 2015 issued in counterpart Japanese Patent Application No. 2012-109948, with English translation (6 pages).
Written Opinion dated Jul. 16, 2013, issued in counterpart International Application No. PCT/JP2013/062259, with English translation. (4 pages).
Notice of Acceptance dated Jul. 1, 2016, issued in counterpart Australian Patent Application No. 2013258901. (3 pages).
Office Action dated Jul. 19, 2016, issued in counterpart Japanese Application No. 2012-109948, with English translation. (5 pages).

* cited by examiner

COMPLEX AMINE ABSORBENT, AND DEVICE AND METHOD FOR REMOVING ONE OR BOTH OF CO₂ AND H₂S

FIELD

The present invention relates to a complex amine absorbent and to a device and a method for removing one or both of $CO_2$ and $H_2S$.

BACKGROUND

The greenhouse effect due to $CO_2$ has recently been pointed out as a cause of global warming, and international measures to address the greenhouse effect are urgently needed to protect the global environment. Sources of $CO_2$ emissions are present in all areas of human activity in which fossil fuel is combusted, and the demand for reducing $CO_2$ emissions tends to further increase. To meet the demand in power generation facilities such as thermal power plants that use a large amount of fossil fuel, intensive research has been conducted on a method of removing and recovering $CO_2$ in flue gas from a boiler by bringing the flue gas into contact with an amine-based $CO_2$ absorbent and on a method of storing recovered $CO_2$ with no emissions to the air. One process used to remove and recover $CO_2$ in flue gas using such a $CO_2$ absorbent described above includes the steps of bringing the flue gas into contact with the $CO_2$ absorbent in an absorber, heating the absorbent containing $CO_2$ absorbed therein in a regenerator to release $CO_2$ and regenerate the absorbent, and recirculating the regenerated absorbent into the absorber to reuse the absorbent (see, for example, Patent Literature 1).

With the method of absorbing, removing, and recovering $CO_2$ in $CO_2$-containing gas such as flue gas using the above-described $CO_2$ absorbent and process, since the process is installed additionally in a combustion facility, it is necessary to reduce the operating cost of the process as much as possible. Particularly, the regeneration step in the above process consumes a large amount of thermal energy, and therefore the energy used in the process must be reduced as much as possible.

In one prior proposal, part of a semi-lean solution is drawn off from a regenerator to the outside. The drawn semi-lean solution exchanges heat with a lean solution in a heat exchanger and then exchanges heat with steam-condensed water in another heat exchanger. The resultant semi-lean solution is returned to a position downward of the drawn-off position. The temperature of the semi-lean solution supplied to the lower side of the regenerator is increased, and the amount of steam consumed is thereby reduced (see, for example, Patent Literature 2 (embodiment 8, FIG. 17)).

Regarding $CO_2$ absorbents, in order to improve the performance thereof, absorbents contributing the improvement in their absorption performance have been proposed (Patent Literatures 3 and 4).

CITATION LIST

Patent Literature

Patent Literature 1: Japanese Laid-open Patent Publication No. 7-51537
Patent Literature 2: Japanese Patent No. 4690659
Patent Literature 3: Japanese Laid-open Patent Publication No. 2008-13400
Patent Literature 4: Japanese Laid-open Patent Publication No. 2008-307519

SUMMARY

Technical Problem

Important performance of a $CO_2$ absorbent includes not only its absorption performance but also its releasing ability when the absorbent is regenerated. One current task is to propose an absorbent having good regeneration performance as well as improved absorption performance that has been extensively studied.

As described above, steam is necessary to recover $CO_2$ from flue gas. Therefore, to achieve energy saving by using a small amount of water vapor while a desired amount of $CO_2$ is recovered, there is a strong demand for an absorbent having not only an absorption ability but also a regeneration ability, for the purpose of reducing operating cost.

In view of the foregoing problems, it is an object of the present invention to provide a complex amine absorbent having not only an absorption ability but also a regeneration ability and a device and a method for removing one or both of $CO_2$ and $H_2S$.

Solution to Problem

According to a first aspect of the present invention in order to solve the above-problems, there is provided a complex amine absorbent for absorbing one or both of $CO_2$ and $H_2S$ in a gas, the complex amine absorbent including: 1) monoethanolamine (MEA), and 2) a primary amine represented by the following formula (1) and having high steric hindrance, with the monoethanolamine and the primary amine being dissolved in water,

(1)

wherein $R_1$ to $R_3$ are each hydrogen or a hydrocarbon group having 1 to 3 carbon atoms, and at least one of the functional groups $R_1$ to $R_3$ is a hydrocarbon.

According to a second aspect of the present invention, there is provided the complex amine absorbent according to the first aspect, wherein the primary amine having high steric hindrance is at least one of 2-amino-1-propanol, 2-amino-1-butanol, 2-amino-3-methyl-1-butanol, 1-amino-2-propanol, 1-amino-2-butanol, and 2-amino-2-methyl-1-propanol.

According to a third aspect of the present invention, there is provided the complex amine absorbent according to the first or second aspect, further including any one of at least one amine selected from linear poly primary and secondary amines and at least one amine selected from cyclic polyamines.

According to a fourth aspect of the present invention, there is provided the complex amine absorbent according to the third aspect, wherein the linear poly primary and secondary amines are ethylenediamine, N,N'-dimethylethylenediamine, N,N'-diethylethylenediamine, propanediamine, and N,N'-dimethylpropanediamine, and the cyclic polyamines are piperazine, 1-methylpiperazine, 2-methylpiperazine, 2,5-dimethylpiperazine, 1-(2-aminoethyl)piperazine, and 1-(2-hydroxyethyl)piperazine.

According to a fifth aspect of the present invention, there is provided the complex amine absorbent according to any one of the first to fourth aspects, wherein the complex amine absorbent is circulated and reused in an absorbing-removing facility including an absorber for absorbing one or both of $CO_2$ and $H_2S$ in the gas and a regenerator in which the one or both of $CO_2$ and $H_2S$ absorbed are released to regenerate the absorbent, a pressure inside the regenerator is 130 to 200 kPa (absolute pressure), an absorption temperature in the absorber is 30 to 80° C., and a regeneration temperature in the regenerator is 110° C. or higher.

According to a sixth aspect of the present invention, there is provided the device for removing one or both of $CO_2$ and $H_2S$, the device comprising: an absorber for removing one or both of $CO_2$ and $H_2S$ by bringing a gas containing one or both of $CO_2$ and $H_2S$ in contact with an absorbent; and a regenerator for regenerating a solution containing the one or both of $CO_2$ and $H_2S$ absorbed therein, the solution regenerated by removing the one or both of $CO_2$ and $H_2S$ in the regenerator being reused in the absorber, wherein the complex amine absorbent according to any one of the first to fifth aspects is used.

According to a seventh aspect of the present invention, there is provided a method of removing one or both of $CO_2$ and $H_2S$, the method comprising: bringing a gas containing one or both of $CO_2$ and $H_2S$ in contact with an absorbent to remove the one or both of $CO_2$ and $H_2S$; regenerating a solution containing one or both of $CO_2$ and $H_2S$ absorbed therein; and reusing, in an absorber, the solution regenerated by removing the one or both of $CO_2$ and $H_2S$ in a regenerator, wherein the complex amine absorbent according to any one of the first to fifth aspects is used to remove the one or both of $CO_2$ and $H_2S$.

Advantageous Effects of Invention

In the present invention, 1) monoethanolamine (MEA) and 2) a primary amine represented by the following formula (1) and having high steric hindrance are dissolved in water to prepare an absorbent. This absorbent has a high ability to release $CO_2$ or $H_2S$ during regeneration of the absorbent, and therefore the amount of water vapor used in a facility for recovering $CO_2$ or $H_2S$ during regeneration of the absorbent can be reduced.

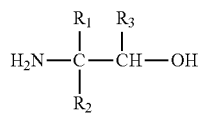

(1)

$R_1$ to $R_3$: H or a hydrocarbon group having 1 to 3 carbon atoms, at least one of $R_1$ to $R_3$ being a hydrocarbon.

DESCRIPTION OF EMBODIMENTS

Figure 1:
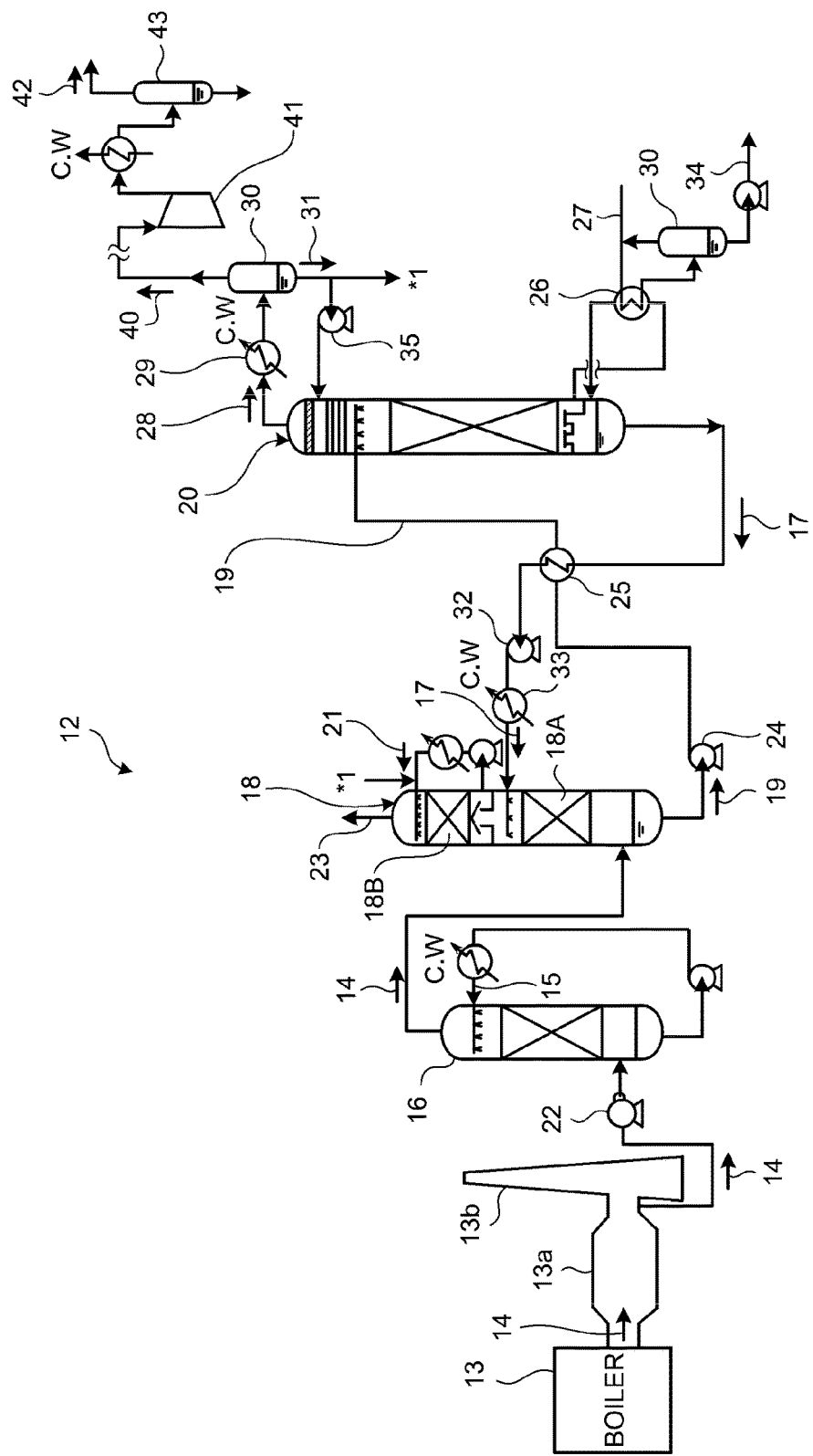
FIG. 1 is a schematic diagram illustrating the configuration of a $CO_2$ recovery unit according to a first embodiment.

The present invention will next be described in detail with reference to the drawings. However, the present invention is not limited by this embodiment. When there are a plurality of embodiments, any combinations of the embodiments are included in the invention. Components in the following embodiments include those that can be easily devised by persons skilled in the art or that are substantially the same.

EMBODIMENTS

A complex amine absorbent according to an embodiment of the present invention is an absorbent that absorbs one or both of $CO_2$ and $H_2S$ in gas and is obtained by dissolving 1) monoethanolamine (MEA) and 2) a primary amine represented by the following formula (1) and having high steric hindrance, in water.

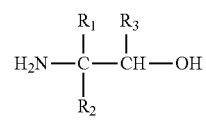

(1)

Herein, $R_1$ to $R_3$ are each hydrogen or a hydrocarbon group having 1 to 3 carbon atoms, and at least one of the functional groups $R_1$ to $R_3$ is a hydrocarbon.

The total concentration of amine in the complex amine absorbent is preferably 30 to 70% by weight and more preferably 40 to 70% by weight.

In the present invention, 1) monoethanolamine (MEA) and 2) the primary amine represented by the above-mentioned formula (1) and having high steric hindrance are dissolved in water to prepare the absorbent. These amines are entangled in a complex manner, and the synergistic effect of these amines provides high ability to absorb one or both of $CO_2$ and $H_2S$ and high ability to release absorbed $CO_2$ or $H_2S$ during regeneration of the absorbent, so that the amount of water vapor used in a $CO_2$ recovery facility during regeneration of the absorbent can be reduced.

The primary amine represented by the above-mentioned formula (1) and having high steric hindrance may be, for example, any one of 2-amino-1-propanol (2A1P), 2-amino-1-butanol (2A1B), 2-amino-3-methyl-1-butanol (AMB), 1-amino-2-propanol (1A2P), 1-amino-2-butanol (1A2B), and 2-amino-2-methyl-1-propanol (AMP).

A combination of the above amines may be used.

When a combination of amines is used, it is preferable to use an absorbent containing 2-amino-2-methyl-1-propanol (AMP) as a base amine and another amine added thereto.

The total concentration of amines in the complex amine absorbent is preferably 30 to 70% by weight. This is because, when the total concentration of amines falls outside this range, the complex amine absorbent does not favorably function as an absorbent.

The weight ratio of 2) the primary amine having high steric hindrance to 1) monoethanolamine (MEA) is within the range of 0.3 to 2.5, preferably within the range of 0.3 to 1.2, and more preferably within the range of 0.3 to 0.7.

This is because, as described in Test Examples later, absorption performance becomes lower than reference absorption performance, i.e., the absorption performance when the concentration of MEA is 30% by weight, which is a concentration generally used in conventional absorbents.

The above ratio is changed according to the total amine concentration. When the total amine concentration is 30% by weight, the ratio is a value close to 0.3.

Any one of at least one amine selected from linear poly primary and secondary amines and at least one selected from cyclic polyamines may be further contained as an assistant. The addition of the assistant improves the rate of reaction, so that energy saving can be achieved.

Preferably, the linear poly primary and secondary amines are ethylenediamine (EDA), N,N'-dimethylethylenediamine (DMEDA), N,N'-diethylethylenediamine (DEEDA), propanediamine (PDA), and N,N'-dimethylpropanediamine (DMPDA), and the cyclic polyamines are piperazine (PZ), 1-methylpiperazine (1MPZ), 2-methylpiperazine (2MPZ), 2,5-dimethylpiperazine (DMPZ), 1-(2-aminoethyl)piperazine (AEPRZ), and 1-(2-hydroxyethyl)piperazine (HEP).

Preferably, the weight ratio of "at least one amine selected from the linear poly primary and secondary amines or at least one amine selected from the cyclic polyamines" to "the complex primary amine absorbent containing monoethanolamine and at least one amine selected from primary amines having high steric hindrance" (the weight ratio of the polyamine/the complex primary amine) is 1 or less.

In the present invention, absorption temperature in an absorber during contact with flue gas containing $CO_2$ etc. is generally within the range of preferably 30 to 80° C. If necessary, an anti-corrosive agent, an anti-degradant, etc. are added to the absorbent used in the present invention.

In the present invention, regeneration temperature in a regenerator in which $CO_2$ etc. are released from the absorbent containing $CO_2$ etc. absorbed therein is preferably 110° C. or higher when the pressure inside the regenerator is 130 to 200 kPa (absolute pressure). This is because, when regeneration is performed below 110° C., the amount of the absorbent circulating in the system must be increased, and this is not preferred in terms of regeneration efficiency.

More preferably, regeneration is performed at 120° C. or higher.

Examples of the gas treated by the present invention include coal gasification gases, synthesis gases, coke-oven gases, petroleum gases, and natural gases, but the gas treated is not limited thereto. Any gas may be used so long as it contains an acid gas such as $CO_2$ or $H_2S$.

No particular limitation is imposed on a process that can be used in a method of removing one or both of $CO_2$ and $H_2S$ in the gas in the present invention. An example of a removing device for removing $CO_2$ will be described with reference to FIG. 1.

FIG. 1 is a schematic diagram illustrating the configuration of a $CO_2$ recovery unit according to embodiment 1. As shown in FIG. 1, a $CO_2$ recovery unit 12 according to embodiment 1 includes: a flue gas cooling unit 16 for cooling, with cooling water 15, flue gas 14 containing $CO_2$ and $O_2$ discharged from an industrial combustion facility 13 such as a boiler or a gas turbine; a $CO_2$ absorber 18 including a $CO_2$ recovery section 18A for removing $CO_2$ from the flue gas 14 by bringing the cooled flue gas 14 containing $CO_2$ into contact with a $CO_2$ absorbent 17 (hereinafter may be referred to as an "absorbent") that absorbs $CO_2$; and an absorbent regenerator 20 for regenerating the $CO_2$ absorbent by causing the $CO_2$ absorbent 19 containing $CO_2$ absorbed therein (hereinafter, this absorbent may also be referred to as a "rich solution") to release $CO_2$. In the $CO_2$ recovery unit 12, the regenerated $CO_2$ absorbent 17 from which $CO_2$ has been removed in the absorbent regenerator 20 (hereinafter, this absorbent may also be referred to as a "lean solution") is reused in the $CO_2$ absorber 18 as the $CO_2$ absorbent.

In FIG. 1, reference numeral 13a represents a flue gas duct, 13b represents a stack, and 34 represents steam-condensed water. The $CO_2$ recovery unit may be retrofitted to an existing flue gas source to recover $CO_2$ therefrom or may be installed together with a new flue gas source. An open-close damper is disposed in a line for the flue gas 14 and is opened during operation of the $CO_2$ recovery unit 12. When the flue gas source is in operation but the operation of the $CO_2$ recovery unit 12 is stopped, the damper is set to be closed.

In a $CO_2$ recovery method using the $CO_2$ recovery unit 12, the flue gas 14 containing $CO_2$ and supplied from the industrial combustion facility 13 such as a boiler or a gas turbine is first increased in pressure by a flue gas blower 22, then supplied to the flue gas cooling unit 16, cooled with the cooling water 15 in the flue gas cooling unit 16, and then supplied to the $CO_2$ absorber 18.

In the $CO_2$ absorber 18, the flue gas 14 comes into countercurrent contact with the $CO_2$ absorbent 17 serving as an amine absorbent according to this embodiment, and the $CO_2$ in the flue gas 14 is absorbed by the $CO_2$ absorbent 17 through a chemical reaction.

The $CO_2$-removed flue gas from which $CO_2$ has been removed in the $CO_2$ recovery section 18A comes into gas-liquid contact with circulating wash water 21 containing the $CO_2$ absorbent and supplied from a nozzle in a water washing section 18B in the $CO_2$ absorber 18, and the $CO_2$ absorbent 17 entrained in the $CO_2$-removed flue gas is thereby recovered. Then a flue gas 23 from which $CO_2$ has been removed is discharged to the outside of the system.

The rich solution, which is the $CO_2$ absorbent 19 containing $CO_2$ absorbed therein, is increased in presser by a rich solution pump 24, heated by the lean solution, which is the $CO_2$ absorbent 17 regenerated in the absorbent regenerator 20, in a rich-lean solution heat exchanger 25, and then supplied to the absorbent regenerator 20.

The rich solution 19 released into the absorbent regenerator 20 from its upper portion undergoes an endothermic reaction due to water vapor supplied from the bottom portion, and most $CO_2$ is released. The $CO_2$ absorbent that has released part or most of $CO_2$ in the absorbent regenerator 20 is referred to as a semi-lean solution. The semi-lean solution becomes the $CO_2$ absorbent (lean solution) 17 from which almost all $CO_2$ has been removed when the semi-lean solution reaches the bottom of the absorbent regenerator 20.

Part of the lean solution 17 is superheated by water vapor 27 in a regeneration superheater 26 to supply water vapor to the inside of the regenerator 20.

$CO_2$-entrained gas 28 accompanied by water vapor produced from the rich solution 19 and semi-lean solution in the absorbent regenerator 20 is discharged from the vertex portion of the absorbent regenerator 20. The water vapor is condensed in a condenser 29, and water is separated by a separation drum 30. $CO_2$ gas 40 is discharged to the outside of the system, compressed by a separate compressor 41, and then recovered. A compressed and recovered $CO_2$ gas 42 passes through a separation drum 43 and then injected into an oil field using Enhanced Oil Recovery (EOR) or reserved in an aquifer to address global warming.

A reflux water 31 separated from the $CO_2$-entrained gas 28 accompanied by water vapor in the separation drum 30 and refluxed therethrough is supplied to the upper portion of the absorbent regenerator 20 through a reflux water circulation pump 35 and also supplied to the circulating wash water 21 through a line *1.

The regenerated $CO_2$ absorbent (lean solution) 17 is cooled by the rich solution 19 in the rich-lean solution heat exchanger 25, then increased in pressure by a lean solution pump 32, cooled in a lean solution cooler 33, and then supplied to the $CO_2$ absorber 18. In the embodiment, their outlines have been described, and part of attachments is omitted in the description.

Preferred Test Examples showing the effects of the present invention will next be described, but the present invention is not limited thereto.

Test Example 1

Figure 2:
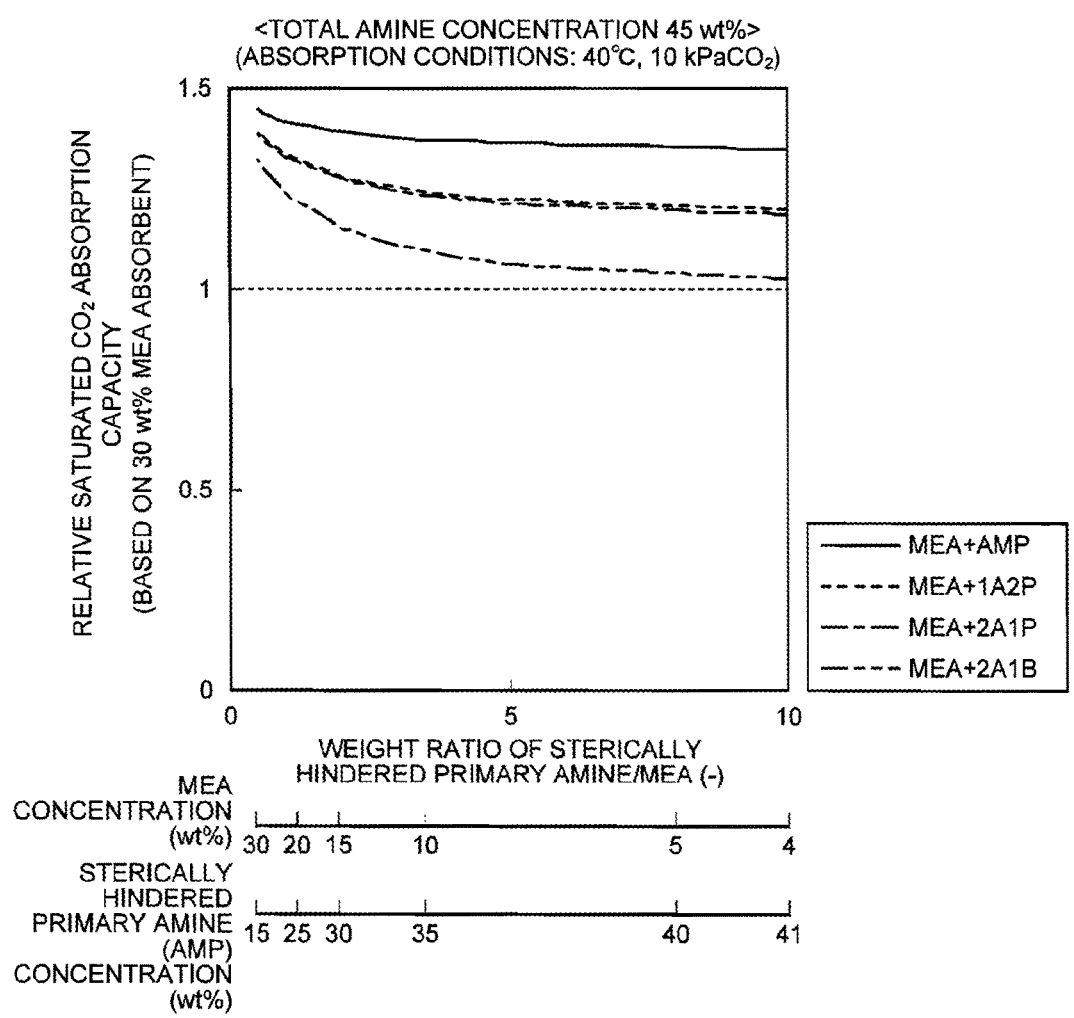
FIG. 2 is a graph showing the relation between relative saturated $CO_2$ absorption capacity and the weight ratio of a sterically hindered primary amine to MEA in Test Example 1 when the total concentration of amines is 45% by weight.
Figure 3:
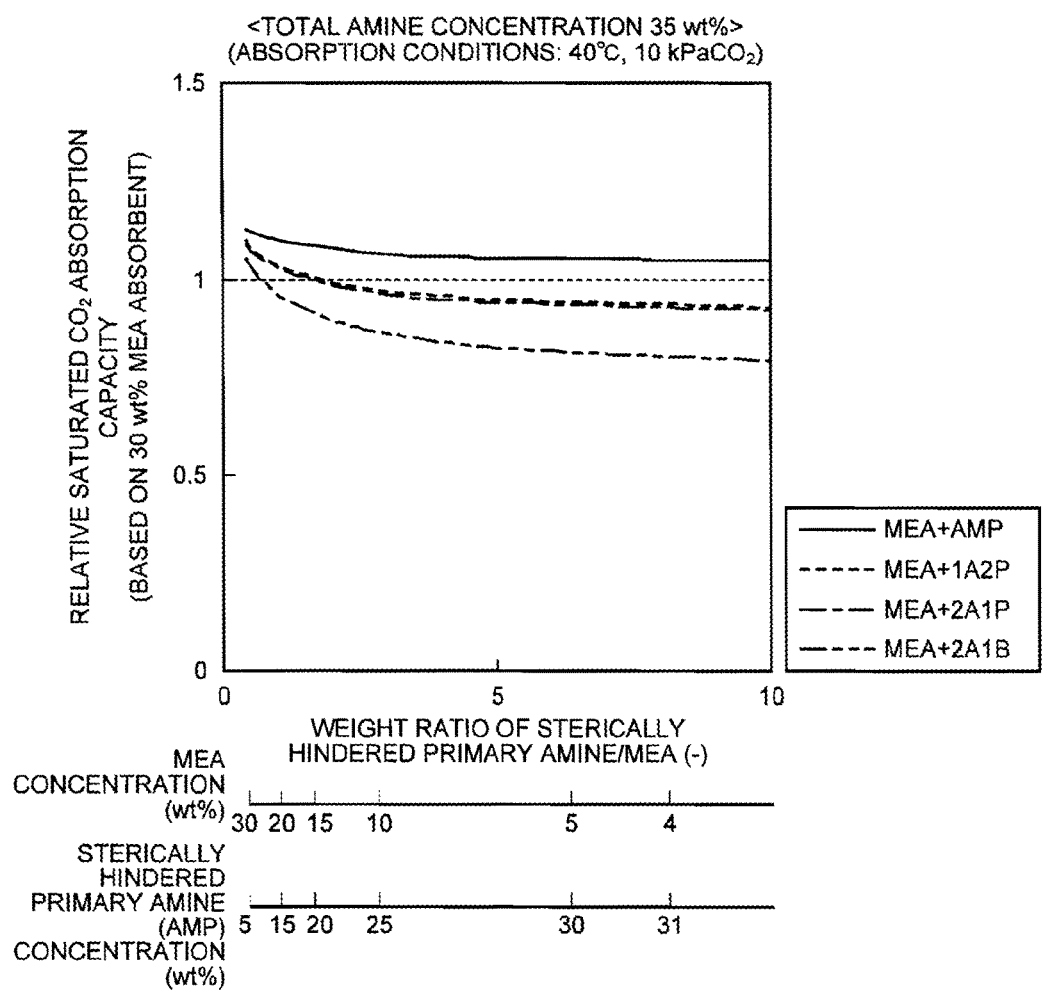
FIG. 3 is a graph showing the relation between relative saturated $CO_2$ absorption capacity and the weight ratio of a sterically hindered primary amine to MEA in Test Example 1 when the total concentration of amines is 35% by weight.

An unillustrated absorption device was used for absorption of $CO_2$. FIGS. 2 and 3 are graphs showing the relation between relative saturated $CO_2$ absorption capacity and the weight ratio of a sterically hindered primary amine to MEA in Test Example 1.

Comparative Example

Reference

A Comparative Example is a conventionally used absorbent containing monoethanolamine (MEA) alone.

An absorbent containing MEA at a concentration of 30% by weight was used as a reference absorbent, and a relative saturated $CO_2$ absorption capacity was shown.

The relative saturated $CO_2$ absorption capacity is determined as follows.

> Relative saturated $CO_2$ absorption capacity=saturated $CO_2$ absorption capacity of an absorbent in the subject application (at a concentration in the Test Example)/saturated $CO_2$ absorption capacity of the MEA absorbent (30 wt %)

Test Example 1

In Test Example 1, one of 2-amino-1-propanol (2A1P), 2-amino-1-butanol (2A1B), 2-amino-3-methyl-1-butanol (AMB), 1-amino-2-propanol (1A2P), and 2-amino-2-methyl-1-propanol (AMP) was used as the primary amine having high steric hindrance at a mixing ratio shown in a lower part of FIG. 2. The amines were dissolved in water and mixed to prepare respective absorbents.

The total amine concentration in Test Example 1 was 45% by weight.

The absorption conditions in this test were 40° C. and 10 kPa $CO_2$.

The results are shown in FIG. 2.

In FIG. 2, the saturated $CO_2$ absorption capacity of the 30 wt % MEA absorbent was used as a reference value of "1," and the relative saturated $CO_2$ absorption capacity of each absorbent was shown.

As shown in FIG. 2, for all the four primary amines having high steric hindrance (2-amino-1-propanol (2A1P), 2-amino-1-butanol (2A1B), 1-amino-2-propanol (1A2P), and 2-amino-2-methyl-1-propanol (AMP)), the relative saturated $CO_2$ absorption capacity was higher than the reference value "1," and the absorption performance was found to be good.

Of these, 2-amino-2-methyl-1-propanol (AMP), in particular, showed a very high value for the absorption performance.

As shown in FIG. 3, even when the total amine concentration was changed from 45% by weight to 35% by weight, the relative saturated $CO_2$ absorption capacity of the amine solution using a combination of monoethanolamine (MEA) and 2-amino-2-methyl-1-propanol (AMP) was higher than a reference value of "1," and the absorption performance was found to be good.

Test Example 2

Comparative Example

Reference

A Comparative Example is a conventionally used absorbent containing monoethanolamine (MEA) alone.

An absorbent containing MEA at a concentration of 30% by weight was used as a reference absorbent, and a relative saturated $CO_2$ concentration difference was shown.

The relative saturated $CO_2$ concentration difference is determined as follows.

> Relative saturated $CO_2$ concentration difference=saturated $CO_2$ concentration difference of an absorbent in the subject application (at a concentration in the Test Example)/saturated $CO_2$ concentration difference of the MEA absorbent (30% by weight)

The saturated $CO_2$ concentration difference is determined as follows.

Saturated $CO_2$ concentration difference=saturated $CO_2$ concentration under absorption conditions−saturated $CO_2$ concentration under recovery conditions Test Example 2

Figure 4:
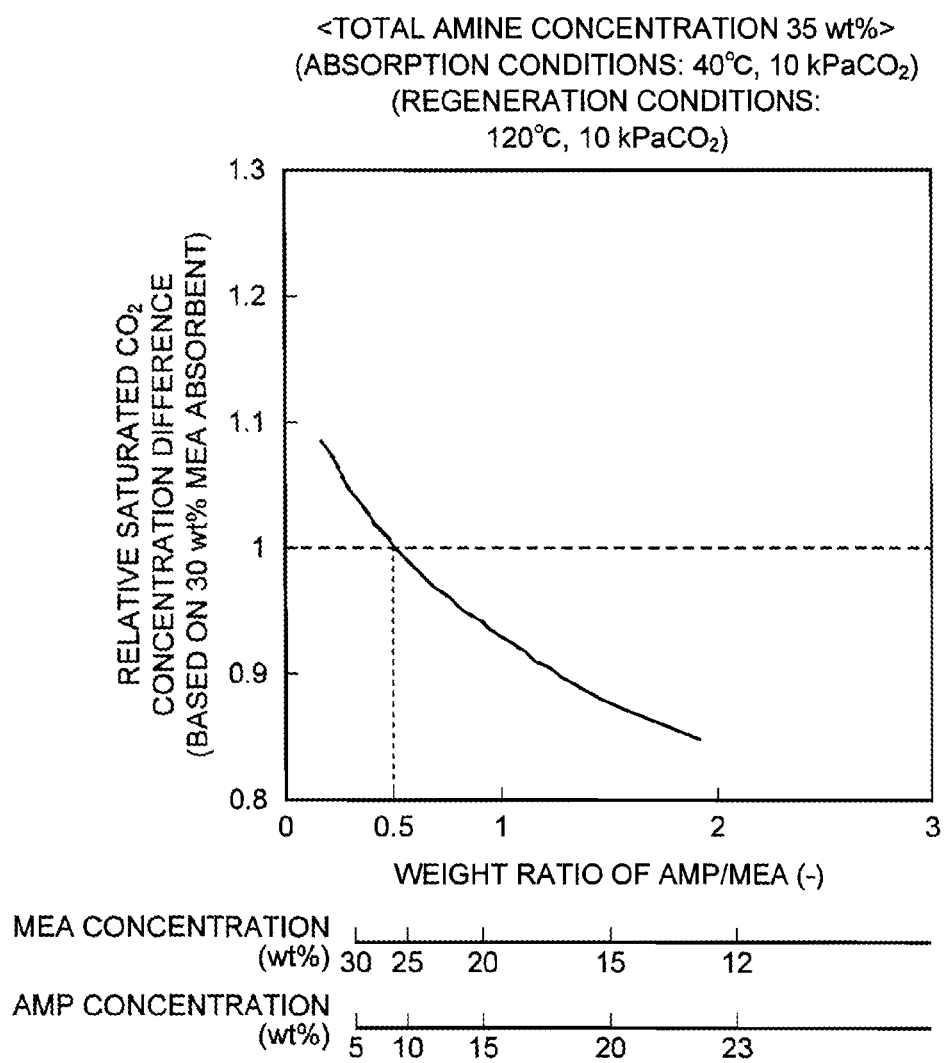
FIG. 4 is a graph showing the relation between relative saturated $CO_2$ concentration difference and the weight ratio of AMP to MEA in Test Example 2 when the total concentration of amines is 35% by weight.
Figure 5:
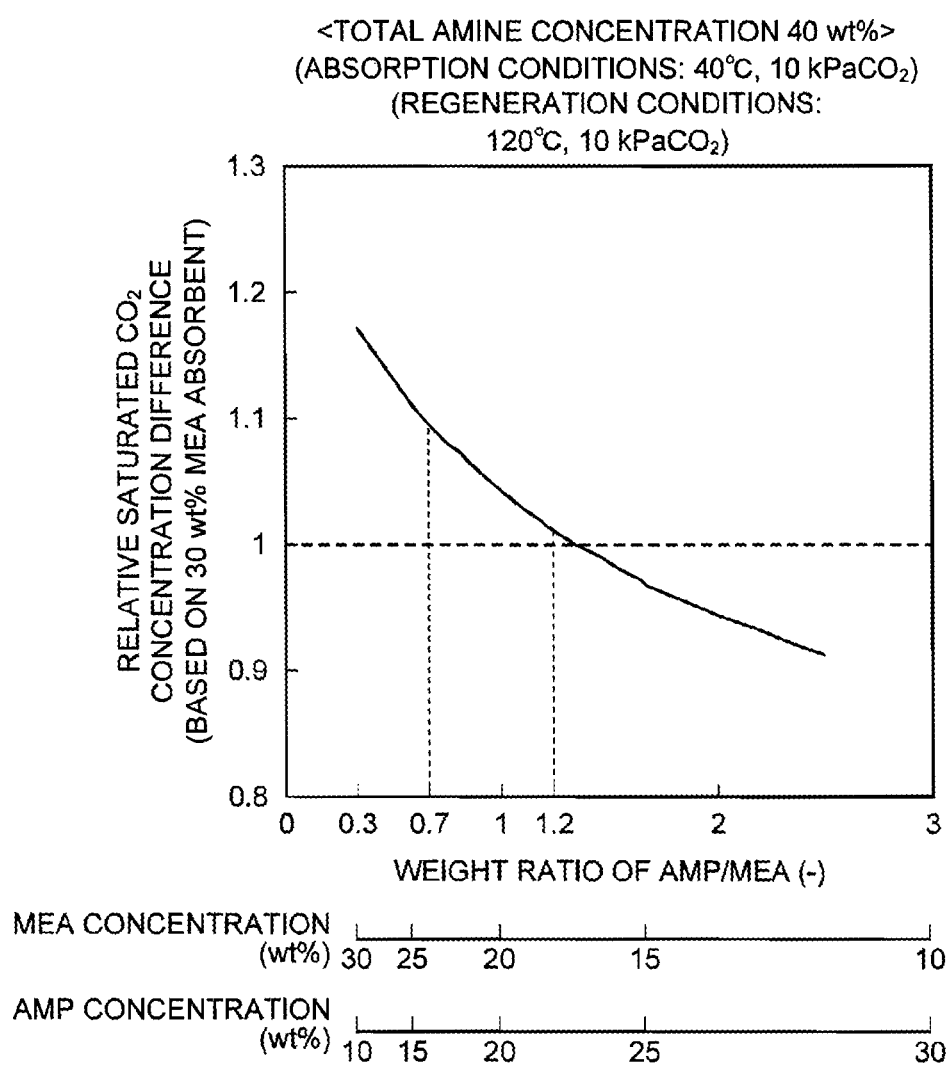
FIG. 5 is a graph showing the relation between relative saturated $CO_2$ concentration difference and the weight ratio of AMP to MEA in Test Example 2 when the total concentration of amines is 40% by weight.
Figure 6:
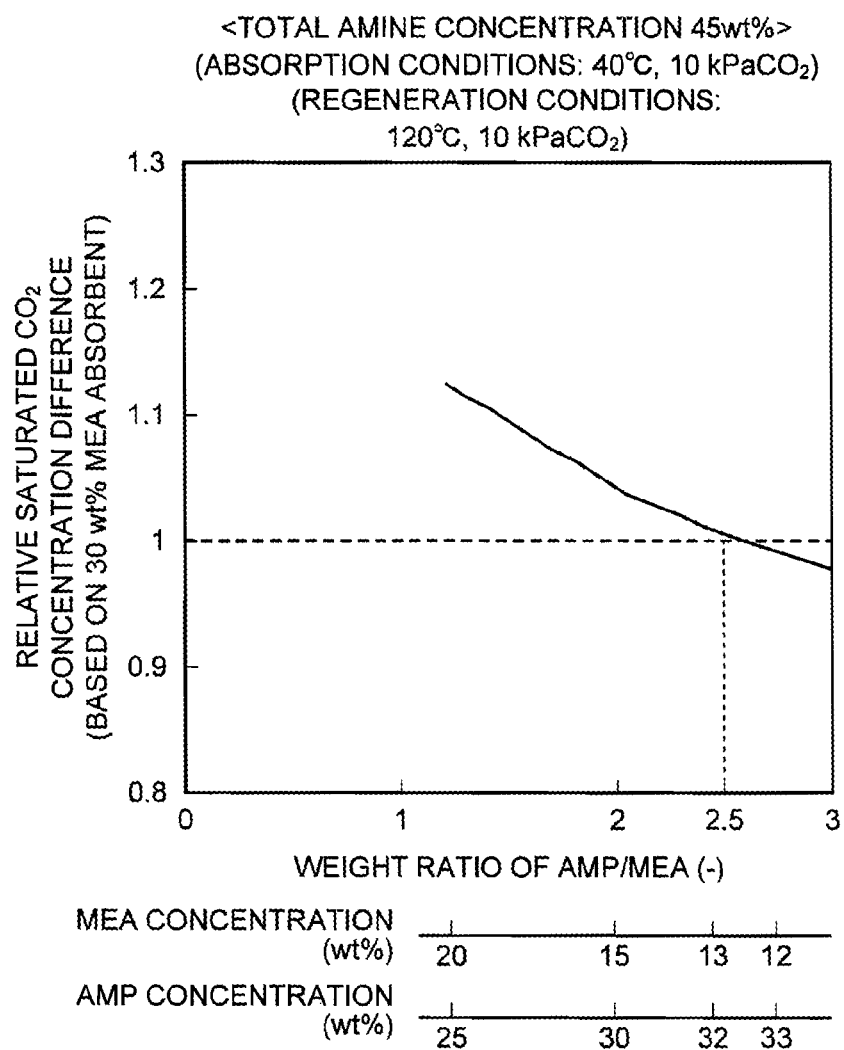
FIG. 6 is a graph showing the relation between relative saturated $CO_2$ concentration difference and the weight ratio of AMP to MEA in Test Example 2 when the total concentration of amines is 45% by weight.

In Test Example 2, 2-amino-2-methyl-1-propanol (AMP) was used as the primary amine having high steric hindrance at a mixing ratio shown in a lower part of each of FIGS. 4 to 6. The amines were dissolved in water and mixed to prepare respective absorbents.

The total amine concentration in Test Example 2-1 was 35% by weight (see FIG. 4).

The total amine concentration in Test Example 2-2 was 40% by weight (see FIG. 5).

The total amine concentration in Test Example 2-3 was 45% by weight (see FIG. 6).

The absorption conditions in the test were 40° C. and 10 kPa $CO_2$.

The recovery conditions were 120° C. and 10 kPa $CO_2$.

The results are shown in FIGS. 4 to 6. FIG. 4 is a graph showing the relation between the relative saturated $CO_2$ concentration difference and the weight ratio of AMP to MEA in Test Example 2-1 in which the total amine concentration is 35% by weight. FIG. 5 is a graph showing the relation between the relative saturated $CO_2$ concentration difference and the weight ratio of AMP to MEA in Test Example 2-2 in which the total amine concentration is 40% by weight. FIG. 6 is a graph showing the relation between the relative saturated $CO_2$ concentration difference and the weight ratio of AMP to MEA in Test Example 2-3 in which the total amine concentration is 45% by weight.

In FIG. 4 to FIG. 6, the saturated $CO_2$ absorption capacity of the 30 wt % MEA absorbent was used as a reference value of "1," and the relative saturated $CO_2$ absorption capacity of each absorbent was shown.

As shown in FIG. 4, in Test Example 2-1 in which 2-amino-2-methyl-1-propanol (AMP) was used as the primary amine having high steric hindrance, the relative saturated $CO_2$ concentration difference was higher than a reference value of "1" when the weight ratio was about 0.5 or less, and the absorption performance was found to be good.

As shown in FIG. 5, in Test Example 2-2 in which 2-amino-2-methyl-1-propanol (AMP) was used as the primary amine having high steric hindrance, the relative saturated $CO_2$ concentration difference was higher than a reference value of "1" when the weight ratio was about 1.2 or less, and the absorption performance was found to be good.

When the weight ratio was about 0.7 or less, the relative saturated $CO_2$ concentration difference was significantly higher than a reference value of "1" (an improvement of about 10%), and the absorption performance was found to be better.

As shown in FIG. 6, in Test Example 2-3 in which 2-amino-2-methyl-1-propanol (AMP) was used as the primary amine having high steric hindrance, the relative saturated $CO_2$ concentration difference was higher than a reference value of "1" when the weight ratio was about 2.5 or less, and the absorption performance was found to be good.

Test Example 3

Comparative Example

Reference

A Comparative Example is a conventionally used absorbent containing monoethanolamine (MEA) alone.

An absorbent containing MEA at a concentration of 30% by weight was used as a reference absorbent, and a reaction rate indicator was shown.

The reaction rate indicator is determined as follows.

Reaction rate indicator=reaction rate index of an absorbent in the subject application (at a concentration in the Test Example)/reaction rate index of the MEA absorbent (30% by weight)

The reaction rate index is determined as follows.

Reaction rate index=(reaction rate constant×amine concentration×diffusion coefficient of $CO_2$)$^{0.5}$ Test Example 3

Figure 7:
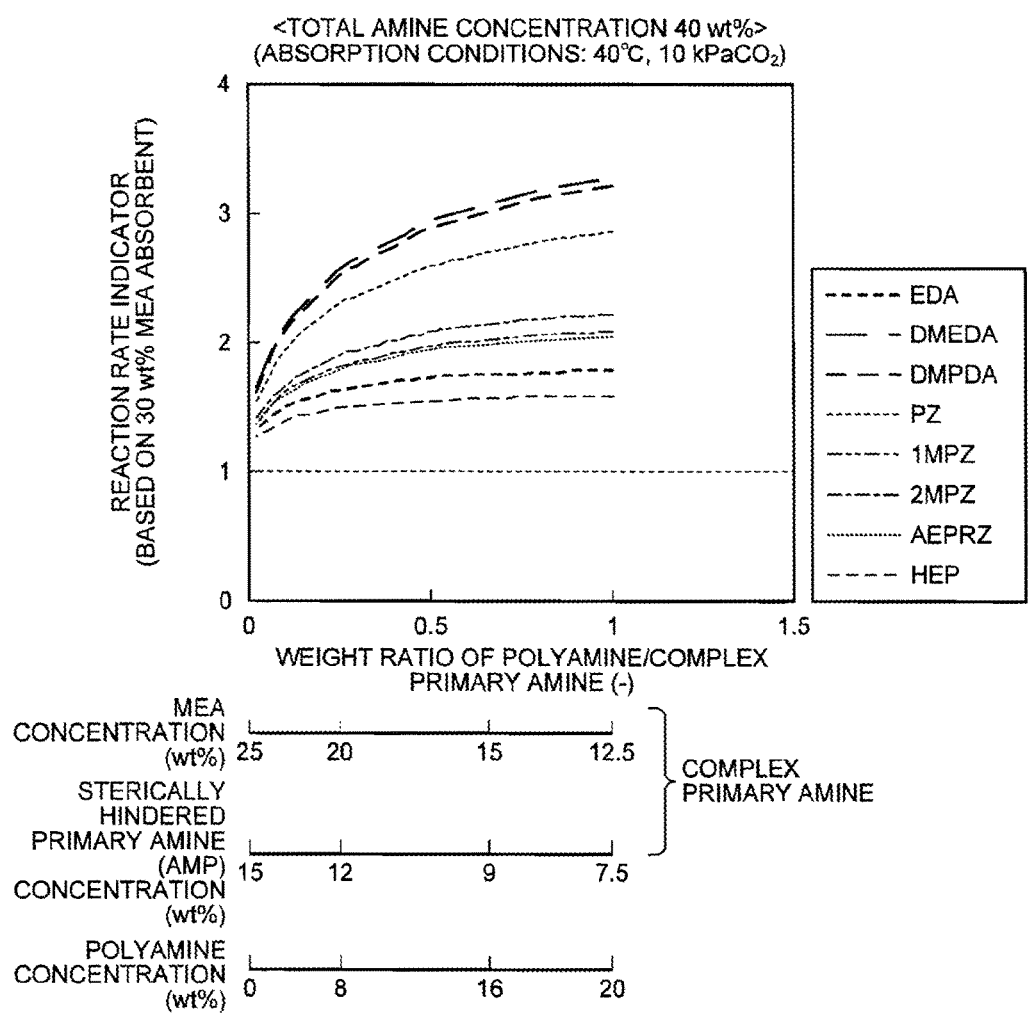
FIG. 7 is a graph showing the relation between reaction rate indicator and the weight ratio of a polyamine to a primary amine in Test Example 3.

In Test Example 3, 2-amino-2-methyl-1-propanol (AMP) was used as the primary amine having high steric hindrance, and a polyamine used as an assistant was added at a mixing ratio shown in a lower part of FIG. 7. These were dissolved in water and mixed to prepare an absorbent.

Ethylenediamine (EDA), N,N'-dimethylethylenediamine (DMEDA), N,N'-diethylethylenediamine (DEEDA), propanediamine (PDA), N,N'-dimethylpropanediamine (DMPDA), piperazine (PZ), 1-methylpiperazine (1MPZ), 2-methylpiperazine (2MPZ), 2,5-dimethylpiperazine (DMPZ), 1-(2-aminoethyl)piperazine (AEPRZ), and 1-(2-hydroxyethyl)piperazine (HEP) were used as the assistant added.

In Test Example 3, the total amine concentration was 40% by weight.

The absorption conditions in this test were 40° C. and 10 kPa $CO_2$.

The results are shown in FIG. 7. FIG. 7 is a graph showing the relation between the reaction rate indicator and the weight ratio of a polyamine to the primary amine in Test Example 3.

In FIG. 7, the reaction rate index of the 30 wt % MEA absorbent was used as a reference vale of "1," and the reaction rate indicator of each absorbent was shown.

As shown in FIG. 7, when any of the assistants (ethylenediamine (EDA), N,N'-dimethylethylenediamine (DMEDA), N,N'-diethylethylenediamine (DEEDA), propanediamine (PDA), N,N'-dimethylpropanediamine (DMPDA), piperazine (PZ), 1-methylpiperazine (1MPZ), 2-methylpiperazine (2MPZ), 2,5-dimethylpiperazine (DMPZ), 1-(2-aminoethyl)piperazine (AEPRZ), and 1-(2-hydroxyethyl)piperazine (HEP)) was added to the complex primary amine composed of monoethanolamine (MEA) and the primary amine having high steric hindrance (2-amino-2-methyl-1-propanol (AMP)), the reaction rate indicator was higher than a reference value of "1," and the absorption performance was found to be good.

Of these, N,N'-dimethylethylenediamine (DMEDA) and N,N'-dimethylpropanediamine (DMPDA), in particular, showed high reaction rate values.

REFERENCE SIGNS LIST

12 $CO_2$ recovery unit
13 Industrial combustion facility
14 Flue gas
16 Flue gas cooling unit
17 $CO_2$ absorbent (lean solution)
18 $CO_2$ absorber
19 $CO_2$ absorbent containing $CO_2$ absorbed therein (rich solution)
20 Absorbent regenerator
21 Wash water

The invention claimed is:

1. A complex amine absorbent for absorbing one or both of $CO_2$ and $H_2S$ in a gas, the complex amine absorbent comprising
   1) monoethanolamine (MEA),
   2) 2-amino-2-methyl-1-propanol, and
   3) at least one selected from the group consisting of N,N'-dimethylethylenediamine, N,N'-diethylethylenediamine, and N,N'-dimethylpropanediamine.

2. The complex amine absorbent according to claim 1, wherein the component 3) is N,N'-dimethylethylenediamine or N,N'-dimethylpropanediamine.

3. A device for removing one or both of $CO_2$ and $H_2S$, the device comprising: an absorber for removing one or both of $CO_2$ and $H_2S$ by bringing a gas containing one or both of $CO_2$ and $H_2S$ in contact with the complex amine absorbent of claim 1; and a regenerator for regenerating a solution containing the one or both of $CO_2$ and $H_2S$ absorbed therein, the absorbent regenerated by removing the one or both of $CO_2$ and $H_2S$ in the regenerator being reused in the absorber.

4. A method of removing one or both of $CO_2$ and $H_2S$, the method comprising: bringing a gas containing one or both of $CO_2$ and $H_2S$ in contact with the complex amine absorbent of claim 1 to remove the one or both of $CO_2$ and $H_2S$; regenerating a solution containing one or both of $CO_2$ and $H_2S$ absorbed therein; and reusing, in an absorber, the absorbent regenerated by removing the one or both of $CO_2$ and $H_2S$ in a regenerator.

5. The method for removing one or both of $CO_2$ and $H_2S$ according to claim 4,
   wherein an absolute pressure inside the regenerator is 130 to 200 kPa,
   an absorption temperature in the absorber is 30 to 80° C., and
   a regeneration temperature in the regenerator is 110° C. or higher.

\* \* \* \* \*